United States Patent [19]

Hurten et al.

[11] Patent Number: 4,712,829
[45] Date of Patent: Dec. 15, 1987

[54] SIDE MEMBER SUPPORT

[75] Inventors: Oskar Hurten, Cologne; Hans Vogt, Overath, both of Fed. Rep. of Germany

[73] Assignee: Ford Motor Company, Dearborn, Mich.

[21] Appl. No.: 848,059

[22] Filed: Apr. 4, 1986

[30] Foreign Application Priority Data

Apr. 3, 1985 [DE] Fed. Rep. of Germany ....... 3512213

[51] Int. Cl.$^4$ .............................................. B62D 25/20
[52] U.S. Cl. ................................... 296/203; 296/204; 296/29; 296/30
[58] Field of Search ............................ 296/187–189, 296/193–195, 203, 204, 29, 30; 280/784, 800, 787, 799

[56] References Cited

U.S. PATENT DOCUMENTS

| | | | |
|---|---|---|---|
| 2,103,915 | 12/1937 | Probst | 280/787 |
| 2,226,790 | 12/1940 | Valletta | 296/204 |
| 2,972,498 | 2/1961 | Kelley | 296/204 |
| 2,991,115 | 7/1961 | Wilfert | 296/203 |
| 3,034,823 | 5/1962 | Himka et al. | 296/204 |
| 3,366,411 | 1/1968 | Vittone | 296/204 |
| 4,030,772 | 6/1977 | Jacob et al. | 296/204 X |
| 4,188,059 | 2/1980 | Bauer et al. | 296/188 |
| 4,189,177 | 2/1980 | Schwuchow et al. | 296/188 |

FOREIGN PATENT DOCUMENTS

| | | | |
|---|---|---|---|
| 739013 | 5/1943 | Fed. Rep. of Germany | 280/787 |
| 2725084 | 12/1978 | Fed. Rep. of Germany | 296/194 |
| 3119666 | 1/1982 | Fed. Rep. of Germany | 296/203 |
| 89475 | 5/1983 | Japan | 296/189 |

Primary Examiner—Dennis H. Pedder
Attorney, Agent, or Firm—Daniel M. Stock; Clifford L. Sadler

[57] ABSTRACT

A side member support is provided for the front part of a self-supporting motor vehicle bodywork of the type having a floor panel comprising a tunnel. On each side of the front part of the vehicle, front side members which are formed from side member panels and have a box-type section and which are each divided in the region of the dashboard or the front part of the floor panel into two bifurcate side member arms. In conjunction with the floor panel the arms form box-type sections, and the side member arm towards the inside of the vehicle adjoins the vehicle tunnel and the side member arm towards the outside of the vehicle adjoins the sill. The front side members are formed from two side member panels integrally with the bifurcate side member arms, and the two side member arms are joined in the lower region of their forking by means of a strongly profiled reinforcement panel.

2 Claims, 4 Drawing Figures

SIDE MEMBER SUPPORT

BACKGROUND OF THE INVENTION

The invention relates to a side member support for the front part of a self-supporting motor vehicle bodywork.

The invention specifically relates to a side member support for the front part of a self-supporting motor vehicle bodywork, having a floor panel comprising a tunnel and, on each side, front side members which are formed from side member panels and which have a box-type section and which are each divided in the region of the dashboard or the front part of the floor panel into two bifurcate side member arms. These arms, in conjunction with the floor panel, form box-type sections. The side member arm towards the inside of the vehicle adjoins the vehicle tunnel, and the side member arm towards the outside of the vehicle adjoins the sill. A support of this type is known from the German Pat. No. 24 08 548.

In the case of the known side member support, as shown in particular in FIG. 4 of the German patent specification, the front side member component is formed by two side member panels which are connected together and which terminate in the region of the dashboard or the front floor panel component. The two bifurcate side member arms which form sections in conjunction with the floor panel box are formed by adjacent, separate side member arm panels.

The known side member support thus has the disadvantage that a continuous energy flow is not produced by forces initiated by a frontal collision, since the welding connection areas between the front side member support and the bifurcate side member arms form an interfering interruption in the load path. In addition, the known side member support has the further disadvantage arising from the way in which the side member arms towards the inside of the vehicle are positioned closely adjacent in the vehicle tunnel. Because of this positioning this tunnel must be made correspondingly high in order to receive the necessary components, such as the change-gear transmission and the cardan shaft.

A side member support for the front part of a self-supporting motor vehicle bodywork of similar type is known from the German Pat. No. 27 25 083. In this known side member support a front side member is likewise formed from side member panels. One of the side member panels extends obliquely over the forward region of the floor panel, while additional side member arm panels which adjoin the front side member, form bifurcate side member arms. The side member arm towards the interior of the vehicle adjoins the vehicle tunnel and the side member arm towards the outside of the vehicle adjoins the door pillar of the A-column.

The known side member support has the advantage over the first-mentioned known side member support in that at least one side member panel extends to a position below the forward region of the floor panel. It has the disadvantage, however, that the welding connections which adversely affect the energy flow are again necessary for the additional bifurcate side member arms.

A front part of a self-supporting motor vehicle bodywork is known from the German Offenlegungsschrift (Laid-Open Specification) No. 30 47 031, in which front side members are formed by a side member panel and a web panel supplementing the latter. The front side members extend only a short distance towards the front region of the floor panel and are joined together there by a side member connection plate.

This known arrangement has the disadvantage that, on account of the projection of the side member panel, the web panel and the side member connection plate project to approximately one level; and in the event of a frontal collision a certain hinge action can occur in this region.

SUMMARY OF THE INVENTION

The object of the invention is to improve a side member support for the front part of a self-supporting motor vehicle bodywork in such a way that a favorable energy flow is ensured which transmits the forces arising in the event of a frontal collision to the front area of the floor panel, while reducing panel components and welding connections required in the manufacture of the motor vehicle bodywork to simplify and make the bodywork manufacture less expensive.

In addition, a secure support of the wheel suspension components of the motor vehicle orientated towards the floor panel is to be provided.

By virtue of the fact that the front side members are formed from two side member panels integrally with the bifurcate side member arms, and the two side member arms are joined in the lower region of their forking by means of a strongly sectioned reinforcement panel, a favorable energy flow from forces originating in a frontal collision to the region of the floor panel adjacent to the vehicle tunnel or the sill of the motor vehicle bodywork is insured. The provision of the reinforcement panel in the region of the forking of the side member arms prevents splitting and in addition provides an expedient support point for the guide rod arrangement of the wheel suspension.

By virtue of the fact that the side member arms positioned towards the inside of the vehicle are connected together by a U-shaped cross member panel, which together with the floor panel forms a box-type section, a cross member is formed in the region of the dashboard or of the front part of the floor panel. In the event of a frontal collision the cross member represents a barrier against drive units being forced backwards.

BRIEF DESCRIPTION OF THE DRAWINGS

The invention is described with reference to an embodiment illustrated in the accompanying drawings, in which.

DESCRIPTION OF A PREFERRED EMBODIMENT

Figure 1:
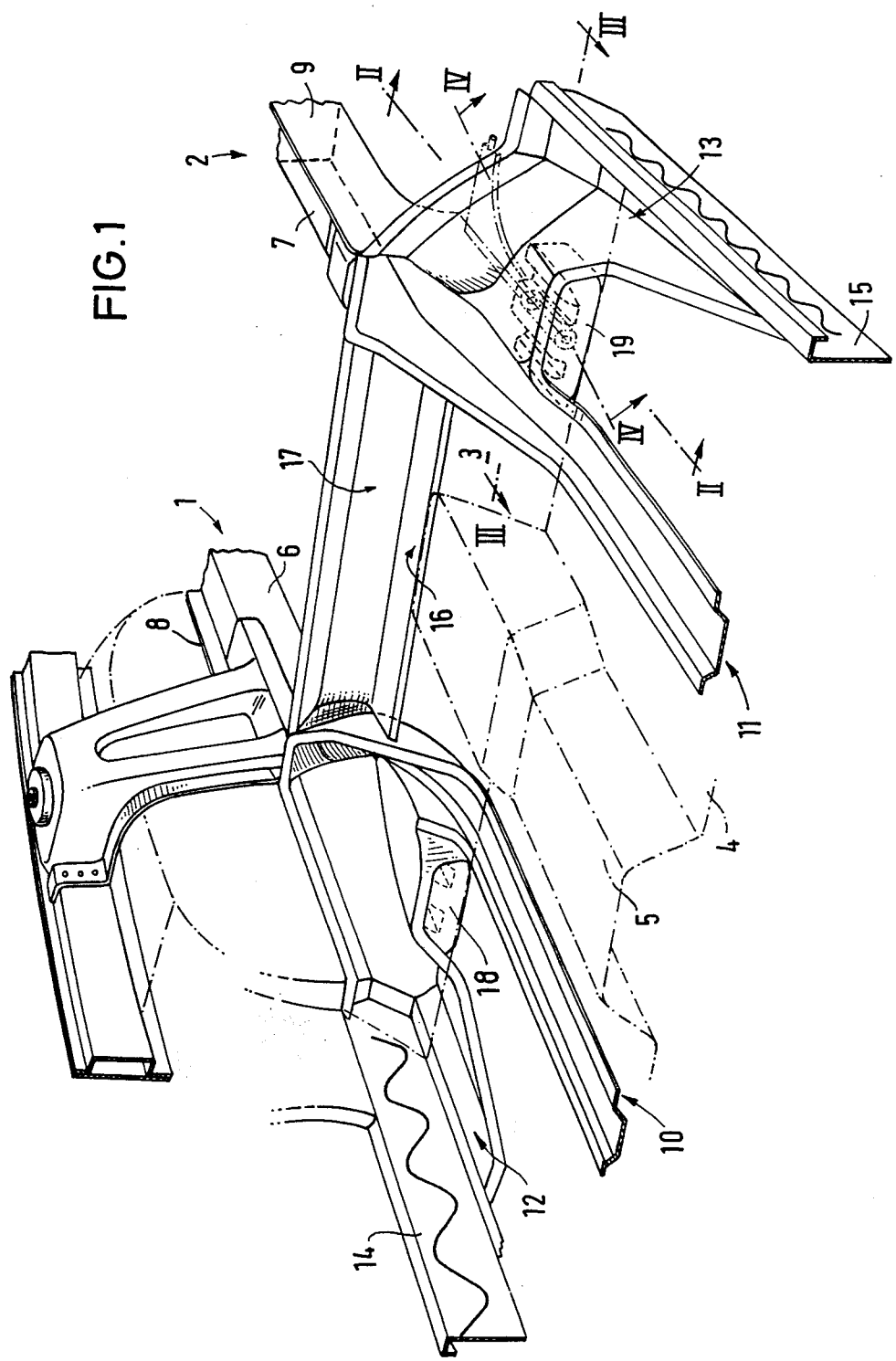
FIG. 1 is an oblique view of the side member support for the front part of a self-supporting motor vehicle bodywork as seen from the passenger compartment towards the dashboard or the front part of the floor panel.

As shown in FIG. 1 the front part of a self-supporting motor vehicle bodywork essentially comprises two front side members 1 and 2, which are joined in their rear areas to the region of the dashboard or the front part 3 of the floor panel 4 or the floor group of the motor vehicle bodywork.

The floor panel 4 is provided in conventional manner with a vehicle tunnel 5 in which the transmission and driving shafts are arranged in known manner.

Each of the two front side members 1 and 2 comprises an inner side member panel 6 and 7 respectively and an outer side member panel 8 and 9 respectively. In their front region the inner side member panels 6 and 7 have a U-shaped cross-section which has vertically orientated welded flanges. Each of the inner side member panels extends in their rear region to below the front area 3 of the floor panel 4. The welded flanges are formed to change in orientation from the vertical arrangement into a horizontal arrangement which closely adjoins the floor panel and forms side member arms 10,11 in the interior of the vehicle.

In their front region the outer side member panels 8 and 9 have a flat section which in the front area 3 of the floor panel 4 is formed to change section into a region which has a V-shaped cross-section extending laterally outwards. It is then formed to define another section in a region which has [a] U-shaped cross-section and which forms side member arms 12 and 13 on the outside of the vehicle which are joined to the floor panel 4 and the sills 14 and 15 by welded flanges closely adjoining the floor panel 4 and the sills 14 and 15 respectively.

The two side member arms 10 and 11 are joined to one another and to the floor panel 4 by a U-shaped cross member panel 16, so as to form a cross member 17 having a box-type section which ensures the transverse stability of the front part of the self-supporting motor vehicle bodywork.

In the event of forces caused by a frontal collision the pronounced lateral outward extension of the outer side member panels 8 and 9 required to form the side member arms 12 and 13 on the outside of the vehicle could result in the side member arms 10 and 12 or 11 and 13 splitting at their forking. Therefore, a strongly sectioned reinforcement panel 18 and 19 respectively is provided in these areas. The reinforcement panels 18 and 19 can advantageously be provided with receiving elements for steering means of the wheel suspension.

Figure 2:
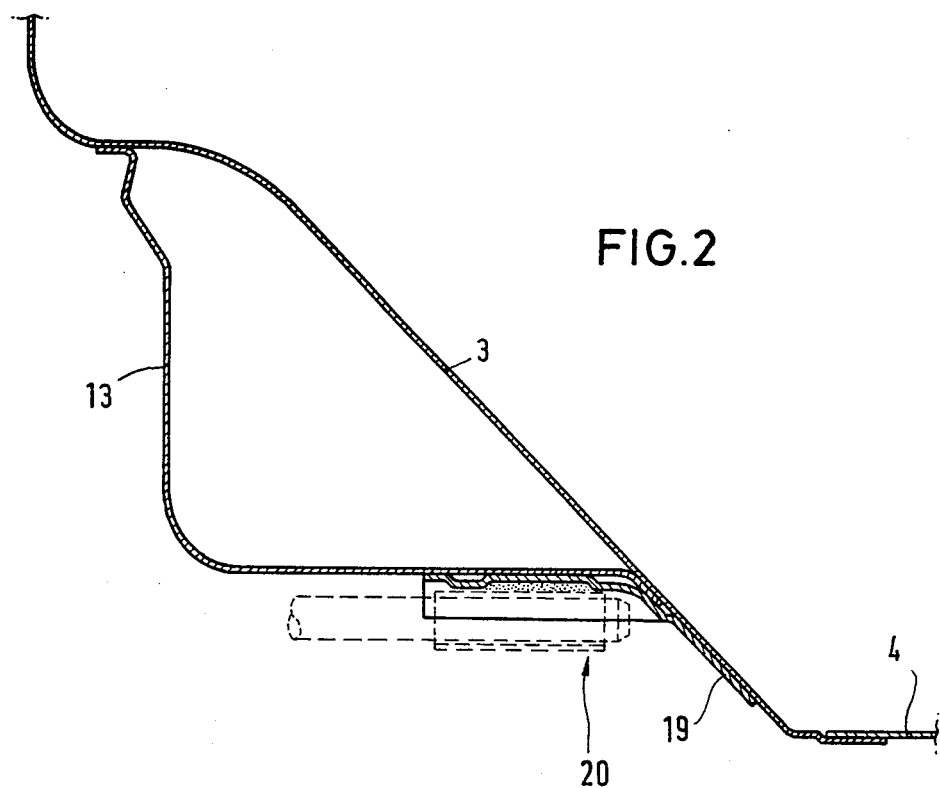
FIG. 2 is a vertical longitudinal section along the line II—II in FIG. 1.

A vertical longitudinal section through the side member support is shown in FIG. 2; it extends parallel to a longitudinal median plane of the motor vehicle and shows the profiled section—which is V-shaped in this area—of the side member arm 13 on the outside of the vehicle and the arrangement of the strongly sectioned reinforcement panel 19. A radius arm 20 for a wheel suspension (not shown) is shown only by way of suggestion.

Figure 3:
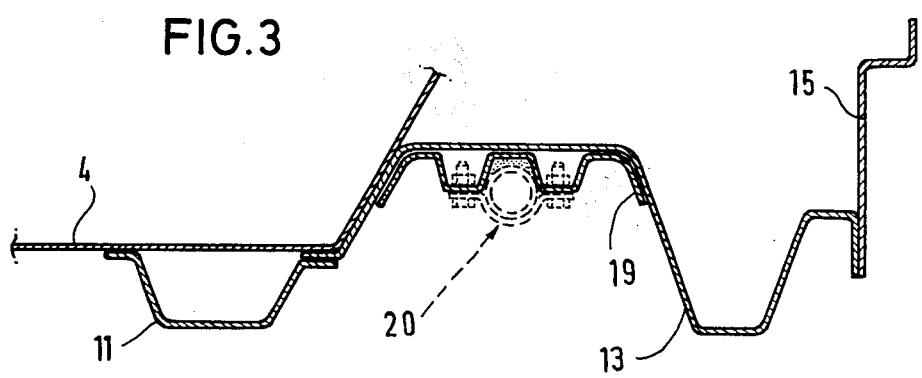
FIG. 3 is a vertical transverse section along the line III—III in FIG. 1.

FIG. 3 is a vertical cross-section which extends parallel to a transverse plane of the vehicle and which shows the box-type profiled section of the two side member arms 11 and 13 and their connection to the reinforcement panel 19 and the floor panel 4 and the sill 15 respectively.

Figure 4:
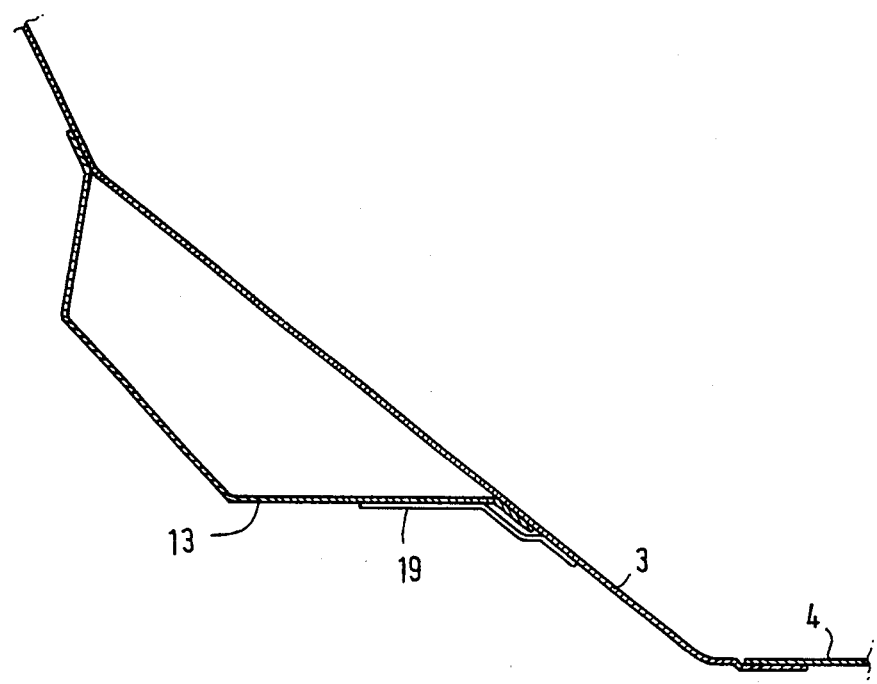
FIG. 4 is a vertical oblique section along the line IV—IV in FIG. 1.

FIG. 4 is a vertical oblique section which shows the box-type profiled section of the two outer side member arms 12 and 13 which is extensive in the region of the sweep and their connection to the front part 3 of the floor panel.

The resilient leg receiving means, which are illustrated in the Figures and which in conjunction with upper side members and plastic coverings for the wheel housings of the front part of the self-supporting motor vehicle bodywork, are not explained in greater detail individually since their designs are already known.

We claim:

1. Improved front side members for the front part of a self-supporting motor vehicle bodywork of the type in which the bodywork includes a floor panel having a tunnel and front side members positioned on opposite lateral sides of the tunnel and extending longitudinally of the vehicle inboard of sill members of the vehicle, each improved front side member comprising laterally inner and outer side member panels arranged together to form:

a front region in which:
the inner side member panel is formed to define a laterally outwardly opening U-shaped cross-section having vertically extending weld flanges; and
the outer side member panel is formed to define a flat cross-section abutting the adjacent inner side member panel weld flanges;

a fork region in which:
the inner side member panel is formed to reorient the weld flanges away from the vertical position abutting the outer side member panel; and
the outer side member panel is formed to extend laterally outwardly in V-shaped cross-section; and a rear region in which:
the inner side member panel is formed to define an upwardly opening U-shaped section having horizontally extending weld flanges secured to the floor panel; and
the outer side member panel is formed to define vertically opening U-shaped cross-sections and having weld flange portions for attachment to the floor panel and the vehicle sill members; and
a reinforcing panel is secured to the outer side member panel proximate its point of attachment to the floor panel.

2. Improved front side members as defined in claim 1 and further comprising a U-shaped cross member panel extending laterally between the spaced front side members and being secured to the front side members and adapted to be secured to the floor panel.

* * * * *